United States Patent
Koyama et al.

(10) Patent No.: US 10,044,890 B2
(45) Date of Patent: Aug. 7, 2018

(54) IMAGE READING APPARATUS WITH ORIGINAL SIZE DETECTION SENSOR

(71) Applicant: CANON KABUSHIKI KAISHA, Tokyo (JP)

(72) Inventors: Hayato Koyama, Kashiwa (JP); Katsuhiro Ishido, Abiko (JP); Daisuke Morikawa, Kashiwa (JP); Hirotaka Seki, Tokyo (JP); Toshitaka Noro, Kashiwa (JP); Yuzuru Yano, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/085,034

(22) Filed: Mar. 30, 2016

(65) Prior Publication Data

US 2016/0295046 A1      Oct. 6, 2016

(30) Foreign Application Priority Data

Apr. 2, 2015   (JP) .................................. 2015-075865

(51) Int. Cl.
  *H04N 1/00*   (2006.01)
(52) U.S. Cl.
  CPC ....... *H04N 1/00779* (2013.01); *H04N 1/0057* (2013.01); *H04N 1/0071* (2013.01); *H04N 1/00745* (2013.01); *H04N 1/00758* (2013.01); *H04N 2201/0094* (2013.01)

(58) Field of Classification Search
  None
  See application file for complete search history.

(56) References Cited

U.S. PATENT DOCUMENTS

| 5,032,904 A   * | 7/1991 | Murai ............... H04N 1/6022 358/500 |
| 2009/0116081 A1 * | 5/2009 | Kasai ............... H04N 1/00588 358/498 |
| 2013/0070309 A1 * | 3/2013 | Sakai ............... H04N 1/401 358/474 |

FOREIGN PATENT DOCUMENTS

| JP | 4905268 B2 | 3/2012 |
| JP | 2013102267 A | 5/2013 |

* cited by examiner

*Primary Examiner* — Thomas D Lee
(74) *Attorney, Agent, or Firm* — Rossi, Kimms & McDowell LLP

(57) ABSTRACT

An image reading apparatus which is capable of successfully reading an image off an original by correctly detecting a size of the original without degrading productivity even if mixed-size originals are placed on an original tray with edges not aligned. An image reading unit reads an image off an original passing through a reading position. An original size detection sensor detects an original. A first original size is determined using a result of detection by the original size detection sensor, and a second original size is determined using the image read off the original. The first original size or the second original size is adopted as an original size.

6 Claims, 13 Drawing Sheets

FIG. 5

| SENSOR OUTPUT | | | SIZE DETECTION RESULT |
|---|---|---|---|
| 401 | 402 | 403 | |
| ON | ON | ON | LARGE ORIGINAL |
| OFF | ON | ON | MEDIUM ORIGINAL |
| OFF | OFF | ON | SMALL ORIGINAL |

IMAGE READING APPARATUS WITH ORIGINAL SIZE DETECTION SENSOR

BACKGROUND OF THE INVENTION

Field of the Invention

The present invention relates to an image reading apparatus with an original size detection sensor.

Description of the Related Art

Conventionally, image reading apparatuses are known which have a moving original reading function of stopping an optical scanning unit, which irradiates an original with light, at a predetermined original reading position to read originals one by one while moving them. Some of these image reading apparatuses have a mixed-size mode in which originals of different sizes are placed on an original tray and successively read while being moved. In the mixed-size mode, original sizes vary from one original to another, and accordingly, an original size detection means is provided on an original conveying path. Zooming, allocation of image data storage memory, and so forth are performed according to an original size detected by the original size detection means.

As the original size detection means, there have been proposed one which has an original size detection sensor, and one which detects an original size from read image data (see, for example, Japanese Laid-Open Patent Publication (Kokai) No. 2013-102267). There has also been proposed one which compares a set original size with an original size detected from read image data, and when they are different, deletes the original size detected from the read image data (see, for example, the specification of Japanese Patent No. 4905268).

However, in an image reading apparatus equipped with an original size detection sensor, there is a need to place mixed-size originals on an original tray with edges aligned on any one side in the mixed-size mode, and defying this leads to a problem that an original size is erroneously detected, and a poor image is generated.

For example, as shown in FIG. 14A, when a large original that is large in size and a small original that is small in size are placed on the original tray with left side edges aligned, not right side edges that are supposed to be aligned, the original size detection sensor may erroneously detect the small original as a large original. Specifically, when originals are placed on the original tray with left side edges aligned, and a copy is made with a setting that selects a print sheet size according to an original size, an image situated at an upper-left corner of a sheet for a large original may be output as shown in FIG. 14C although an output shown in FIG. 14B is expected. Also, when a print sheet size is set to a size for a small original, and a copy is made with a setting that zooms a read image according to a sheet size and performs printing, a reduced image may be output as shown in FIG. 14D.

On the other hand, in an image reading apparatus that detects an original size from read image data, there is no need to align originals even in the mixed-size mode, but it is impossible to determine an original size before reading of the original is started. Namely, a timing at which an original size is determined comes later than a timing at which an original size is determined based on a result of detection by the original size detection sensor.

SUMMARY OF THE INVENTION

The present invention provides an image reading apparatus which is capable of, in a mixed-size mode, successfully reading an image off an original by correctly detecting a size of the original without degrading productivity even if mixed-size originals are placed on an original tray with edges not aligned.

Accordingly, the present invention provides an image reading apparatus comprising an original tray on which an original is placed, a conveying unit configured to convey the original on the original tray along a conveying path, an original detection unit configured to detect an original, an image reading unit configured to read an image off the original passing through a reading position and output image data, a first determination unit configured to determine a size of an original in a width direction using a result of detection by the original detection unit, a second determination unit configured to determine a size of an original in the width direction using the image data, and a selection unit configured to obtain a reading mode for the original, and when the reading mode is a first reading mode in which a bundle of originals including originals having the same size in the width direction is read, select the size of the original in the width direction determined by the first determination unit, and when the reading mode is a second reading mode in which a bundle of originals including a plurality of originals of different sizes in the width direction is read, select the size of the original in the width direction determined by the second determination unit.

According to the present invention, the image reading apparatus has the selection unit that selects whether to adopt an original size determined by the first determination unit using a result of detection by the original detection unit or an original size determined by the second determination unit using an image read off an original. Thus, by adopting an original size determined by the second determination unit as an original size for the mixed-size mode, an image is successfully read off an original by correctly detecting a size of the original without degrading productivity even if edges of mixed-size originals on an original tray are not aligned.

Further features of the present invention will become apparent from the following description of exemplary embodiments (with reference to the attached drawings).

BRIEF DESCRIPTION OF THE DRAWINGS

FIG. 5 is a view showing a correspondence table of sensor outputs from the original size detection sensor and original sizes.

DESCRIPTION OF THE EMBODIMENTS

Hereafter, embodiments of the present invention will be described in detail with reference to the drawings.

Figure 1:
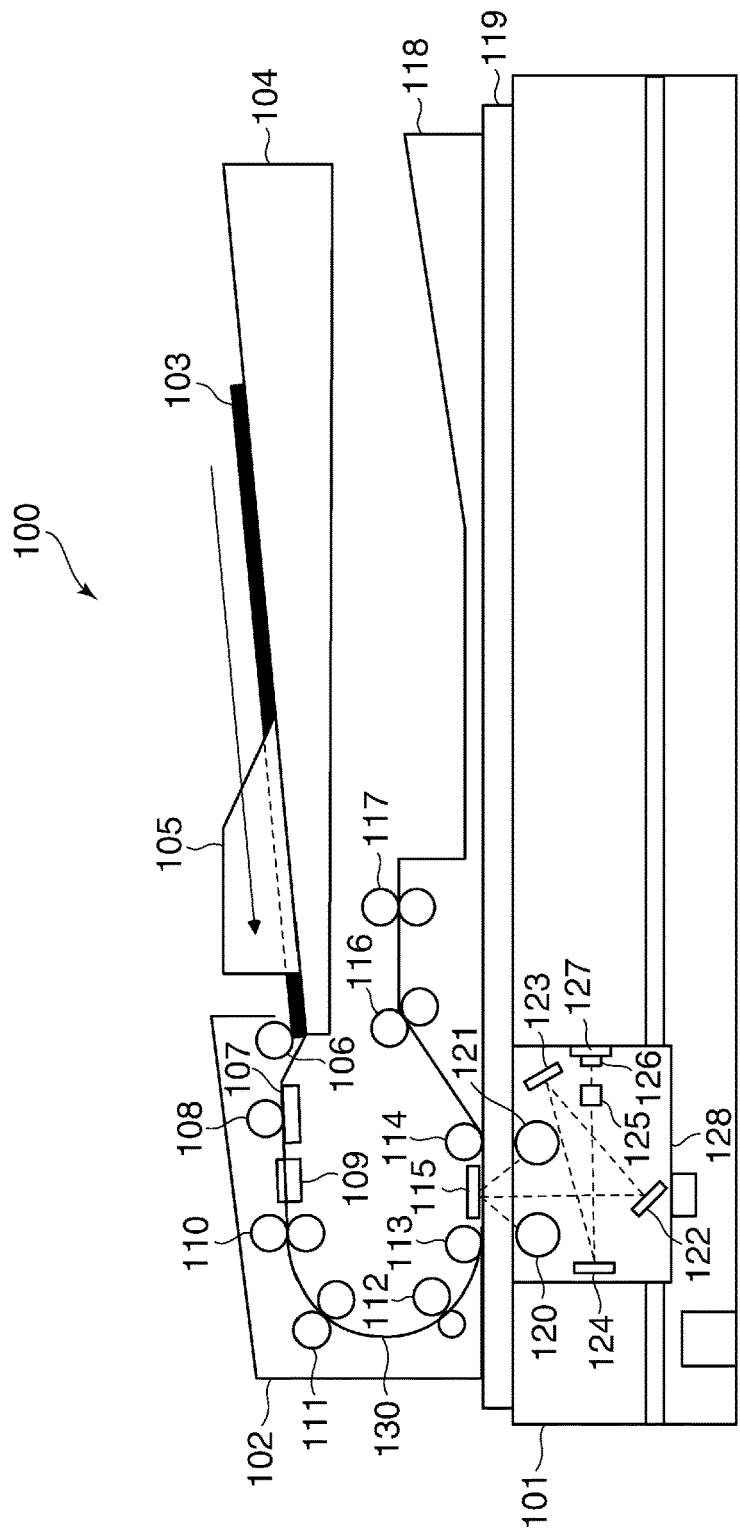
FIG. 1 is a cross-sectional view schematically showing an arrangement of an image reading apparatus according to an embodiment of the present invention.

FIG. 1 is a cross-sectional view schematically showing an arrangement of an image reading apparatus according to an embodiment of the present invention.

Referring to FIG. 1, the image reading apparatus 100 is comprised mainly of a reader unit 101 which reads originals, and an automatic original feeder (ADF) 102 which conveys originals to the reader unit 101. The ADF 102 has an original tray 104, width restriction plates 105 provided on the original tray 104, a pickup roller 106, a curved conveying path 130 which is a conveying route, a reading glass 119, and a discharged-sheet tray 118. A batch of originals 103 is placed on the original tray 104, and the width restriction plates 105 abut on two sides of an original to prevent skewed conveyance thereof.

At an entrance of the conveying path 130, a separation unit comprised of a separation pad 107 and a separation roller 108 is provided. The separation unit separates originals one by one from an uppermost part of the batch of originals 103 that has been delivered to the separation unit by the pickup roller 106. An original size detection sensor 109 is provided downstream of the separation unit. The original size detection sensor 109 detects sizes of originals, which have been separated by the separation unit, one by one by detecting the presence or absence of an original.

First registration rollers 110, second registration rollers 111, first conveying rollers 112, a second conveying roller 113, and a third conveying roller 114 are placed in this order downstream of the original size detection sensor 109 on the conveying path 130. The first registration rollers 110 and the second registration rollers 111 correct for skewed conveyance of an original. A white color opposed member 115 is interposed between the second conveying roller 113 and the third conveying roller 114. Fourth conveying rollers 116 and sheet discharging rollers 117 are provided further downstream of the third conveying roller 114.

In FIG. 1, the reading unit 128 is placed at a location opposed to the white color opposed member 115 across the reading glass 119. The reading unit 128 has light sources 120 and 121, a line sensor 126 that receives light, which is emitted from the light sources and reflected on an original surface, via reflective mirrors 122, 123, and 124 and an image forming lens 125, and a signal processing substrate 127.

An original that has been conveyed from the original tray 104 to an area, which is an original reading position (reading position), between the white color opposed member 115 and the reading glass 119 through the conveying path 130 is irradiated with light from the light sources 120 and 121. Light emitted from the light sources 120 and 121 and reflected on a surface of the original is led to the image forming lens 125 via the reflective mirrors 122, 123, and 124, converged on the image forming lens 125, and then forms an image on the line sensor 126 comprised of image pickup devices such as CCDs or the like arranged in a line. An optical signal that is the image formed on the line sensor 126 is converted into an electric signal by the line sensor 126, converted into a digital signal by the signal processing substrate 127 and then subjected to image processing.

An original that has conveyed up to the original reading position and image information on a surface of which has been read at the original reading position is conveyed by the third conveying roller 114 and the fourth conveying rollers 116 and discharged onto the discharged-sheet tray 118 by the sheet discharging rollers 117.

Figure 2:
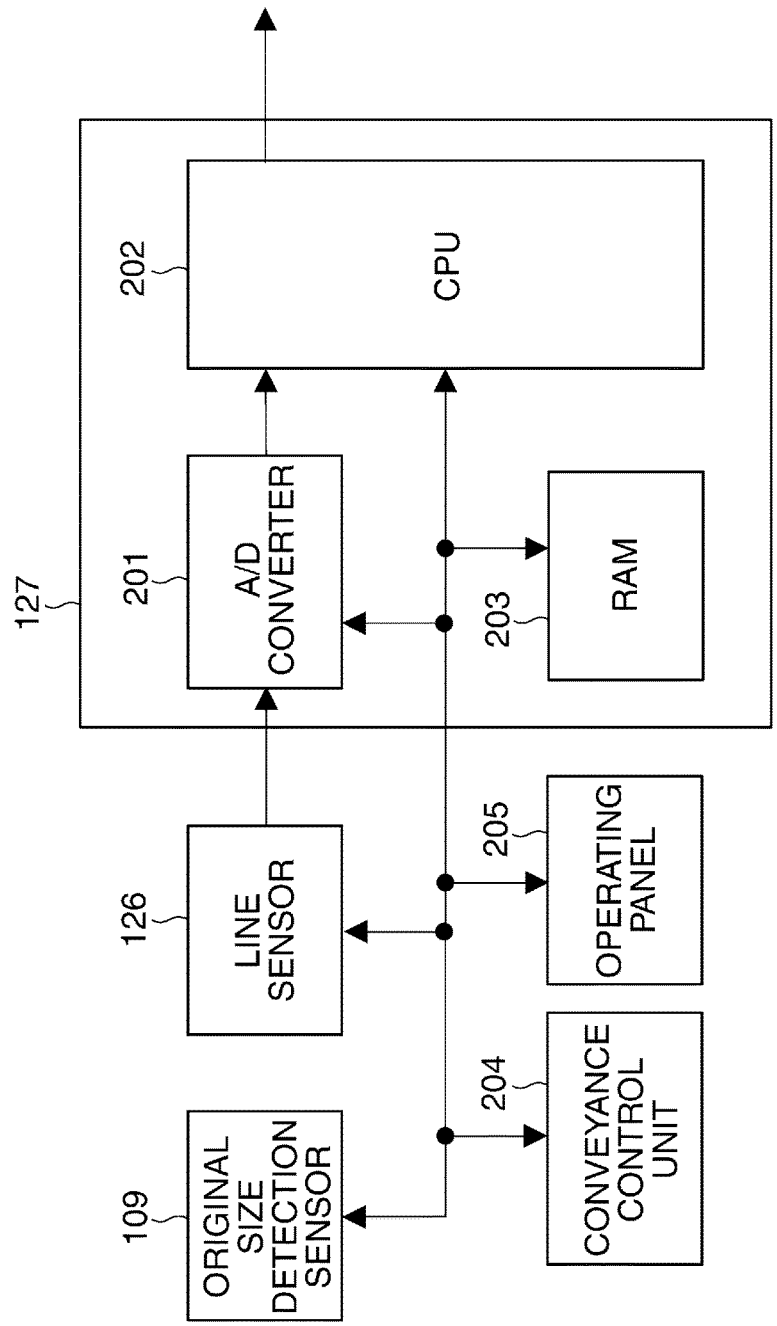
FIG. 2 is a block diagram showing an arrangement of a signal processing substrate in the image reading apparatus in FIG. 1.

FIG. 2 is a block diagram showing an arrangement of the signal processing substrate in the image reading apparatus in FIG. 1.

Referring to FIG. 2, the signal processing substrate 127 has an AD converter 201, a CPU 202, and a RAM 203. The CPU 202 is connected to the line sensor 126, the AD converter 201, the RAM 203, a conveyance control unit 204, an operating panel 205, and the original size detection sensor 109 and controls these units.

The AD converter 201 converts analog image data sent from the line sensor 126 into digital image data. The digital image data converted by the AD converter 201 is sent to the CPU 202 and stored in the RAM 203. The CPU 202 determines an original size based on the digital image data stored in the RAM 203 or a result of detection by the original size detection sensor 109. The operating panel 205 receives operations from the user and displays messages for the user. When an original bundle includes a plurality of originals of different sizes in a width direction, the user sets a mixed-size mode as a reading mode by operating the operating panel 205. In the present embodiment, the reading mode includes a mixed-size mode and a normal mode. The normal mode refers to a reading mode in which an original bundle including only originals having the same size is read. It should be noted that the normal mode is set when an original has only one page.

The conveyance control unit 204 controls operation of the rollers that are used to convey originals. The original size detection sensor 109 is comprised of a plurality of sensors and detects an original size. The plurality or sensors is arranged at a same position in a conveying direction and is arranged at different positions in a direction perpendicular to the conveying direction (width direction of an original).

The CPU 202 notifies the original size to a controller, not shown, and transmits image data stored in the RAM 203 according to an image data transmitting request from the controller. The controller reserves a memory area corresponding to the notified original size in a storage device in the controller. The controller then notifies an image data transmitting request to the CPU 202. The controller stores image data received from the CPU 202 in the memory area reserved in the storage device.

A description will now be given of an original size detection process which is carried out by the image reading apparatus in FIG. 1.

Figure 3:
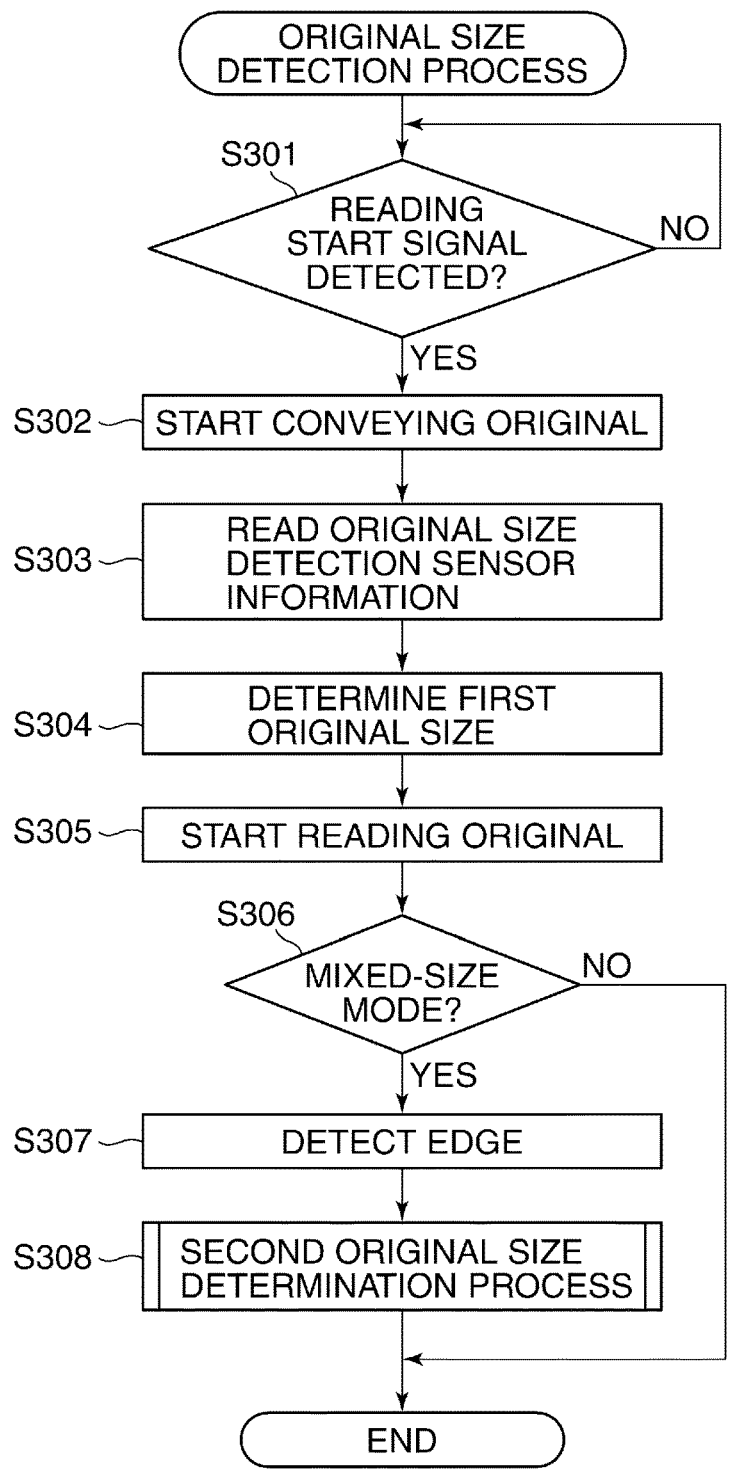
FIG. 3 is a flowchart showing the procedure of an original size detection process which is carried out by the image reading apparatus in FIG. 1.

FIG. 3 is a flowchart showing the procedure of the original size detection process which is carried out by the image reading apparatus in FIG. 1. The original size detection process is carried out by the CPU 202 of the signal processing substrate 127 in accordance with an original size detection program stored in a ROM, not shown.

In this original size detection process, the user is prompted to select whether or not to set the mixed-size mode as the reading mode, and when the mixed-size mode is not set as the reading mode, a first original size detection result obtained by the original size detection sensor 109 is adopted as a final original size. On the other hand, when the mixed-size mode is set as the reading mode, a second original size detection result obtained by detecting a leading edge of image data is adopted as a final original size.

Referring to FIG. 3, first, the CPU 202 judges whether or not it has detected an original reading start signal, and upon detecting the original reading start sigma, starts the original size detection process (step S301). The original reading start signal is input by the user through the operating panel 205 and detected by the CPU 202 receiving it from the operating panel 205. At this time, the CPU 202 reads reading mode information set by the user together with the original reading start signal. It should be noted that when mixed originals of different sizes are included in an original bundle, the user makes a setting that originals are mixed ones using the operating panel 205 before inputting the original reading start signal.

After detecting the original reading start signal ("YES" in the step S301), the CPU 202 starts conveying an original by controlling the conveyance control unit 204 (step S302).

Figure 4A:
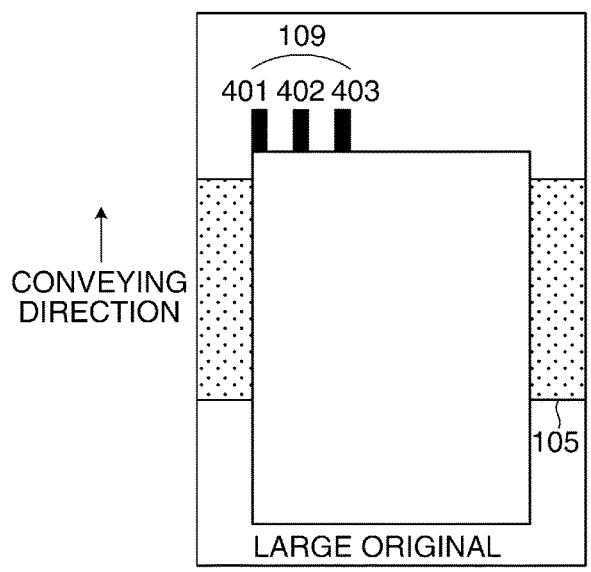
FIGS. 4A to 4C are views useful in explaining an original size detection sensor.
Figure 4B:
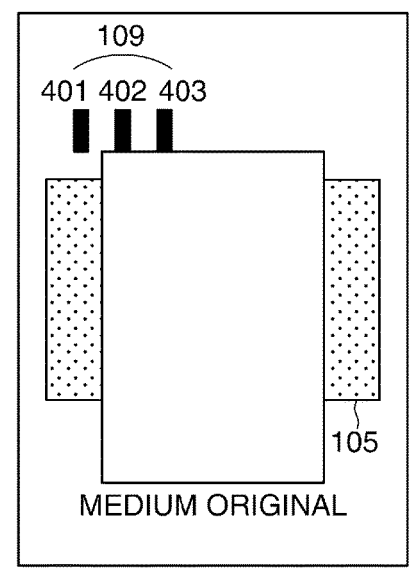
Figure 4C:
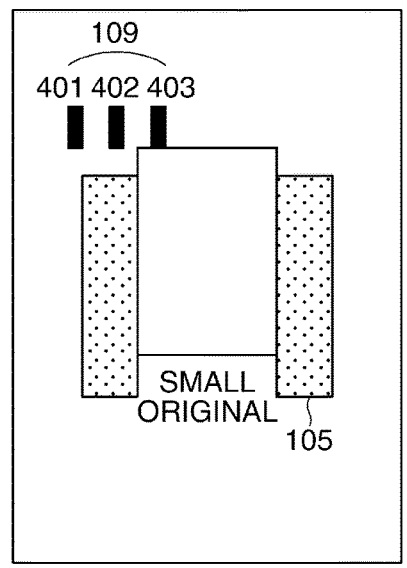

Next, the CPU 202 reads information from the original size detection sensor 109 (step S303) and determines a first original size based on the read information (step S304). FIGS. 4A to 4C are views useful in explaining the original size detection sensor 109. Referring to FIGS. 4A to 4C, the original size detection sensor 109 is comprised of three sensors 401, 402, and 403 placed for respective original sizes in a main scanning direction on the conveying path. The three sensors 401, 402, and 403 are original detection sensors that detect the presence or absence of an original, and they are on while sensing an original. A size of an original in the main scanning direction, which is sandwiched by the width restriction plates 105 that are restriction members restricting an original in a width direction, is determined depending on a combination of the turned-on sensors 401 to 403 according to a correspondence table in FIG. 5. The main scanning direction corresponds to a width direction of an original and a direction perpendicular to a conveying direction of an original.

FIG. 5 is a view showing the correspondence table of sensor outputs from the original size detection sensor 109 and original sizes.

Referring to FIG. 5, when outputs from all the sensors 401, 402, and 403 are on, it is judged that an original is a large original that is large in size (see FIG. 4A). On the other hand, when an output from the sensor 401 is off, and outputs from the sensors 402 and 403 are on, it is judged that an original is a medium original that is medium in size (see FIG. 4B). When outputs from the sensors 401 and 402 are off, and an output from the sensor 403 is on, it is judged that an original is a small original that is small in size (see FIG. 4C). A size of an original in a sub scanning direction is detected by measuring a timer period for which the sensors 401 to 403 are on. The sub scanning direction corresponds to a longitudinal direction of an original and the conveying direction of an original.

Referring again to FIG. 3, after determining the first original size, the CPU 202 starts reading an image off the original (step S305). At this time, the CPU 202 controls the AD converter 201 of the signal processing substrate 127 to photoelectrically convert the image read off the original, and stores the original image data received via the AD converter 201 in the RAM 203. Then, based on the reading mode information read together with the original reading start signal in the step S301, the CPU 202 judges whether or not the reading mode is the mixed-size mode. In the present embodiment, the CPU 202 judges whether the reading mode is the mixed-size mode or the normal mode (step S306). As a result of the judgment in the step S306, when the reading mode is the mixed-size mode ("YES" in the step S306), the CPU 202 reads out the image data stored in the RAM 203 to perform edge detection and stores the result of edge detection in the RAM 203 (step S307).

Then, as for edges detected in the step S307, the CPU 202 checks consecutiveness in the main scanning direction at a leading end of the original to determine a second original size (step S308). The CPU 202 then adopts the determined second original size as a final original size and terminates the original size detection process. The CPU 202 then notifies the determined original size to the controller.

On the other hand, as a result of the judgment in the step S306, when the reading mode is the normal mode ("NO" in the step S306), the CPU 202 adopts the first original size determined in the step S304 as a final original size and terminates the original size detection process. The CPU 202 then notifies the determined original size to the controller.

A description will now be given of a second original size detection process which is a subroutine in the step S308 in FIG. 3.

Figure 6:
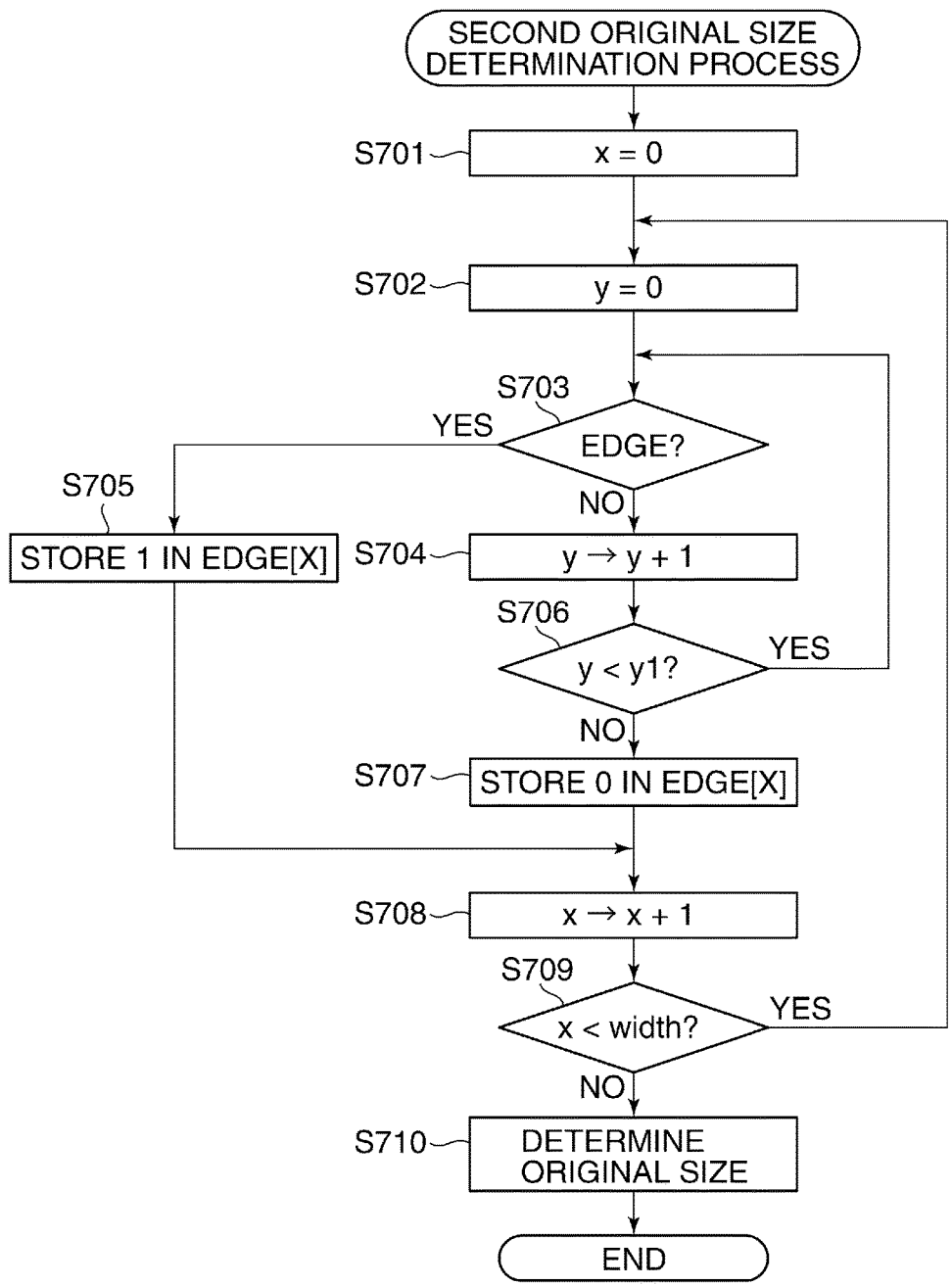
FIG. 6 is a flowchart showing the procedure of a second original size detection process which is carried out in step S308 in FIG. 3.

FIG. 6 is a flowchart showing the procedure of the second original size detection process. The second original size detection process as well is carried out by the CPU 202 of the signal processing substrate 127 in accordance with a second original size detection program stored in the ROM, not shown.

Referring to FIG. 6, when the second original size detection process is started, the CPU 202 resets a main scanning counter x, which indicates a position in the main scanning direction, to zero (step S701). The CPU 202 then resets a sub scanning counter y, which indicates a position in the sub scanning direction, to zero (step S702). After resetting the main scanning counter x and the sub scanning counter y, the CPU 202 carries out an edge detection process by referring to the original image data stored in the RAM 203 based on the main scanning counter x and the sub scanning counter y.

Figure 7:
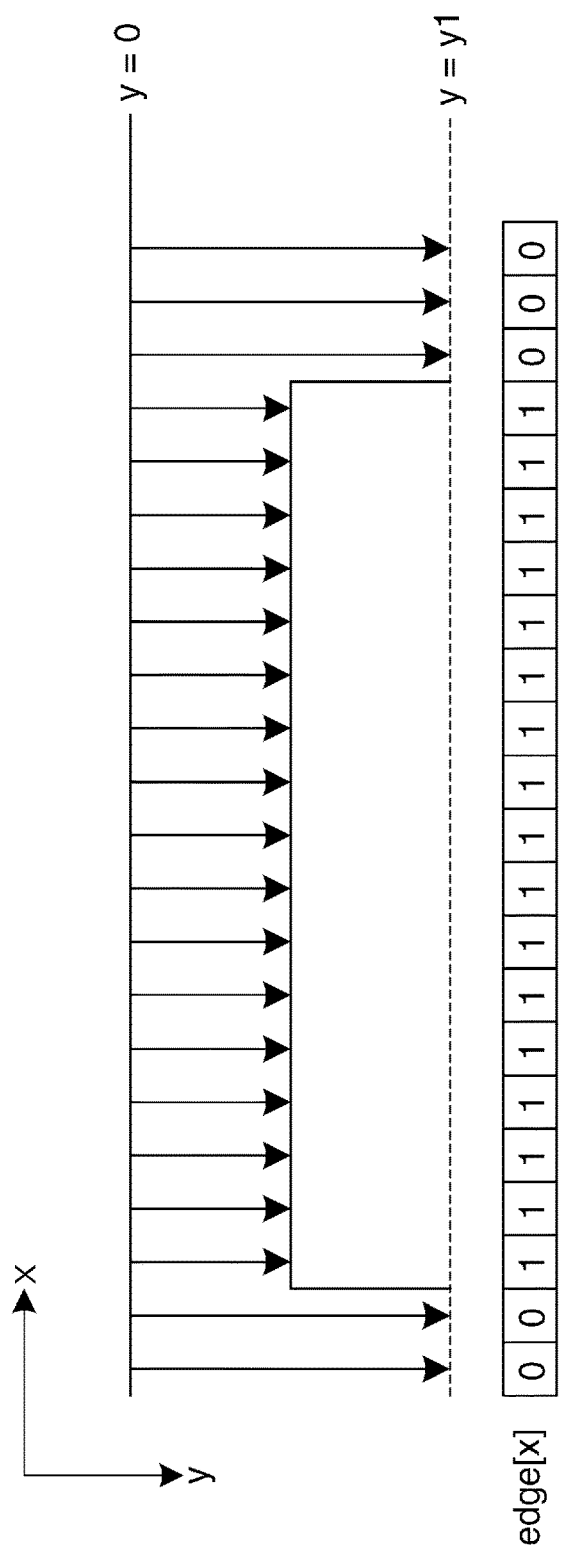
FIG. 7 is a view useful in explaining an edge detection process.

FIG. 7 is a view useful in explaining the edge detection process.

At a leading end of an original, an edge appears in the sub scanning direction. In the present embodiment, the edge in the sub scanning direction is detected so as to determine an original size in the main scanning direction. The original is possibly conveyed in a skewed state. In the present embodiment, a leading end area (range from y=0 to y=y1) in which the leading end of the original is always included is set, and whether or not there is an edge in the leading end area is determined for respective main scanning positions.

In the edge detection process with respect to a pixel of interest, a filtering process and a threshold value determination process are carried out using original image data of a pixel, which is adjacent to and on the same main scanning position as the pixel of interest, and original image data of the pixel of interest, and whether the pixel of interest is an edge is detected. The filtering process and the threshold value determination process are well known techniques, and thus detailed explanations thereof are omitted here.

As shown in FIG. 7, in the edge detection process, whether or not there is an edge within a range from y=0 to y=y1 in the sub scanning direction is judged with respect to each of main scanning positions, and judgment results are stored as edge[x] in the RAM 203. Referring to FIG. 7, when an edge is detected, 1 is stored, and when no edge is detected, 0 is stored. After edge detection over the whole area in the main scanning direction is completed, the number of consecutive 1 is counted by referring to data stored in edge[x], and based on the counting result, a size of the original in the main scanning direction is determined.

Referring again to FIG. 6, after resetting the main scanning counter x and the sub scanning counter y, the CPU 202 judges whether or not a pixel at a position (x, y) in the original image data is an edge (step S703). As a result of the judgment in the step S703, when the pixel at the position (x, y) is not an edge ("NO" in the step S703), the CPU 202 increments the sub scanning counter y by one (step S704).

The CPU 202 then judges whether or not the sub scanning counter y is less than an edge detection range end position y1 (step S706). As a result of the judgment in the step S706, when the sub scanning counter y is not less than the edge detection range end position y1 ("NO" in the step S706), the CPU 202 stores 0 in the edge judgment result storage array edge[x] (step S707). The CPU 202 then increments the main scanning counter x by one (step S708) and judges whether or not the main scanning counter x is less than a main scanning reading area end position width (step S706). As a result of the judgment in the step S709, when the main scanning counter x is not less than the main scanning reading area end position width ("NO" in the step S709), the CPU 202 determines an original size based on the edge judgement result storage array edge [x] (step S710). Namely, the CPU 202 counts the number of consecutive 1 stored in the edge judgment result storage array edge[x] to determine an original size corresponding to the number of consecutive 1 as the original size.

On the other hand, as a result of the judgment in the step S703, when the pixel at the position (x, y) is an edge ("YES" in the step S703), the CPU 202 stores 1 in the edge judgment result storage array edge[x] (step S705), followed by the process proceeding to the step S708.

As a result of the judgment in the step S706, when the sub scanning counter y is less than the edge detection range end position y1 ("YES" in the step S706), the process returns to the step S703, in which the CPU 202 in turn carries out the above described process again. As a result of the judgment in the step S709, when the main scanning counter x is less than the main scanning reading area end position width ("YES" in the step S709), the process returns to the step S702, in which the CPU 202 in turn carries out the above described edge detection process again.

According to the process in FIG. 6, edge detection is performed over the whole area of an original image in the main scanning direction, and based on a counting result indicative of the number of consecutive data 1 indicating that an edge has been detected, a size of an original in the main scanning direction is determined. Thus, a size of an original in the main scanning direction is correctly determined as a second original size.

According to the present embodiment, when the reading mode is the mixed-size mode ("YES" in the step S306), the second original size detected from a leading edge of image data is adopted as a final original size. On the other hand, when the reading mode is the normal mode ("NO" in the step S306), the first original size determined in the step S304 is adopted as a final original size.

Thus, the way of detecting an original size is switched according to the reading mode. Therefore, when the reading mode is the normal mode, it is possible to determine an original size at an early timing with high accuracy. On the other hand, when the reading mode is the mixed-size mode, a timing at which an original size is determined is late. However, an original size is correctly detected without aligning originals on one side on the original tray even in the mixed-size mode, and hence generation of a poor quality image caused by a difference in the way of placing originals is prevented.

In the present embodiment, the image reading apparatus may be a single apparatus or may constitute a part of a copier, a facsimile, a multifunction peripheral, or the like with a combination of other functions.

A description will now be given of a second embodiment.

A hardware arrangement of an image reading apparatus according to the second embodiment differs from that of the image reading apparatus according to the first embodiment (FIG. 1) in that a one-side alignment sensor 801 is added as a part of the original size detection sensor. The one-side alignment sensor 801 detects whether or not an original properly abuts on the width restriction plates 105.

Figure 8:
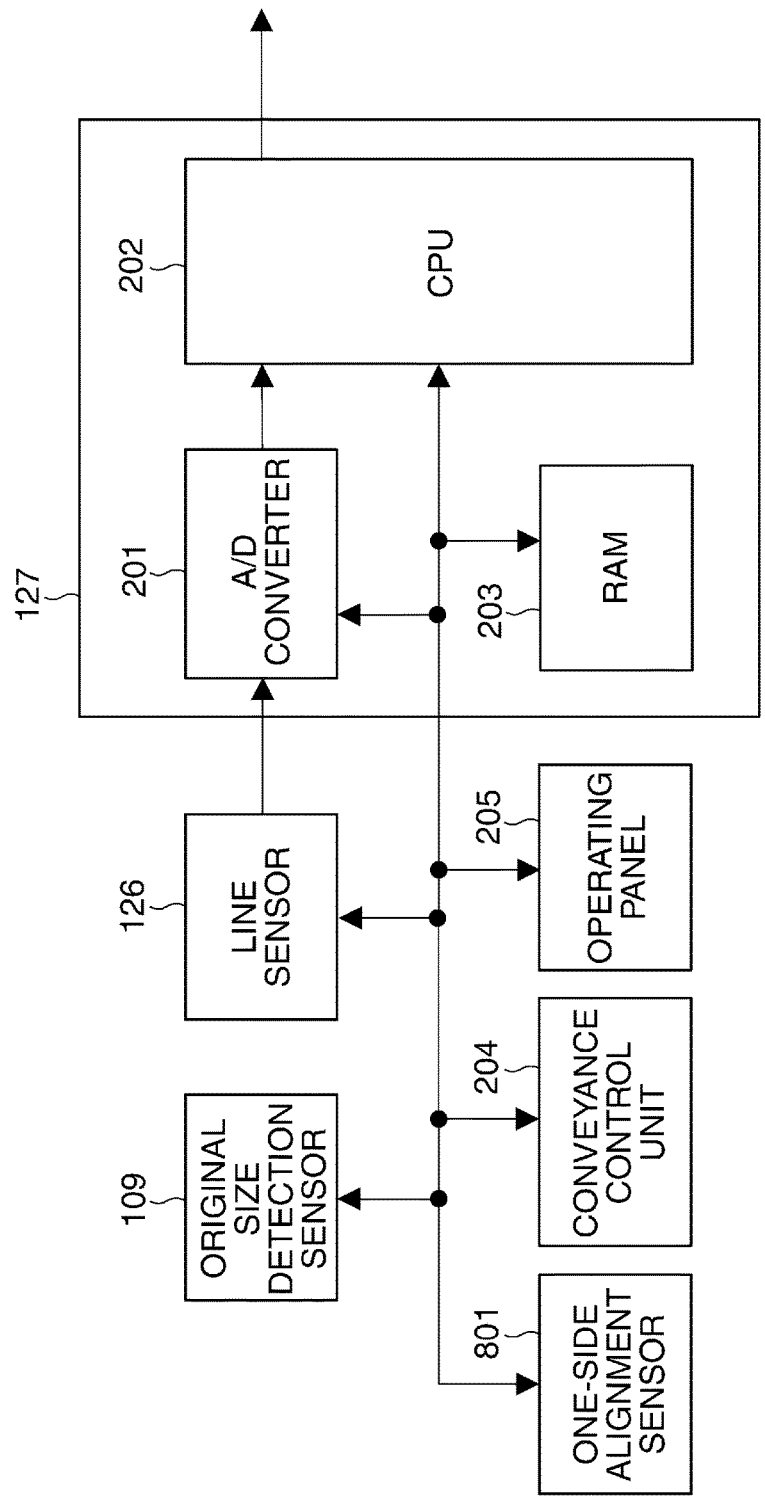
FIG. 8 is a block diagram showing an arrangement of a signal processing substrate in an image reading apparatus according to a second embodiment.

FIG. 8 is a block diagram showing an arrangement of the signal processing substrate 127 in the image reading apparatus according to the second embodiment. Referring to FIG. 8, the CPU 202 of the signal processing substrate 127 according to the present embodiment is connected to the one-side alignment sensor 801 and controls the one-side alignment sensor 801 to detect whether or not an original properly abuts on the width restriction plates 105. It should be noted that an image reading operation in the present embodiment is the same as that in the first embodiment.

A description will now be given of an original size detection process which is carried out in the present embodiment.

Figure 9:
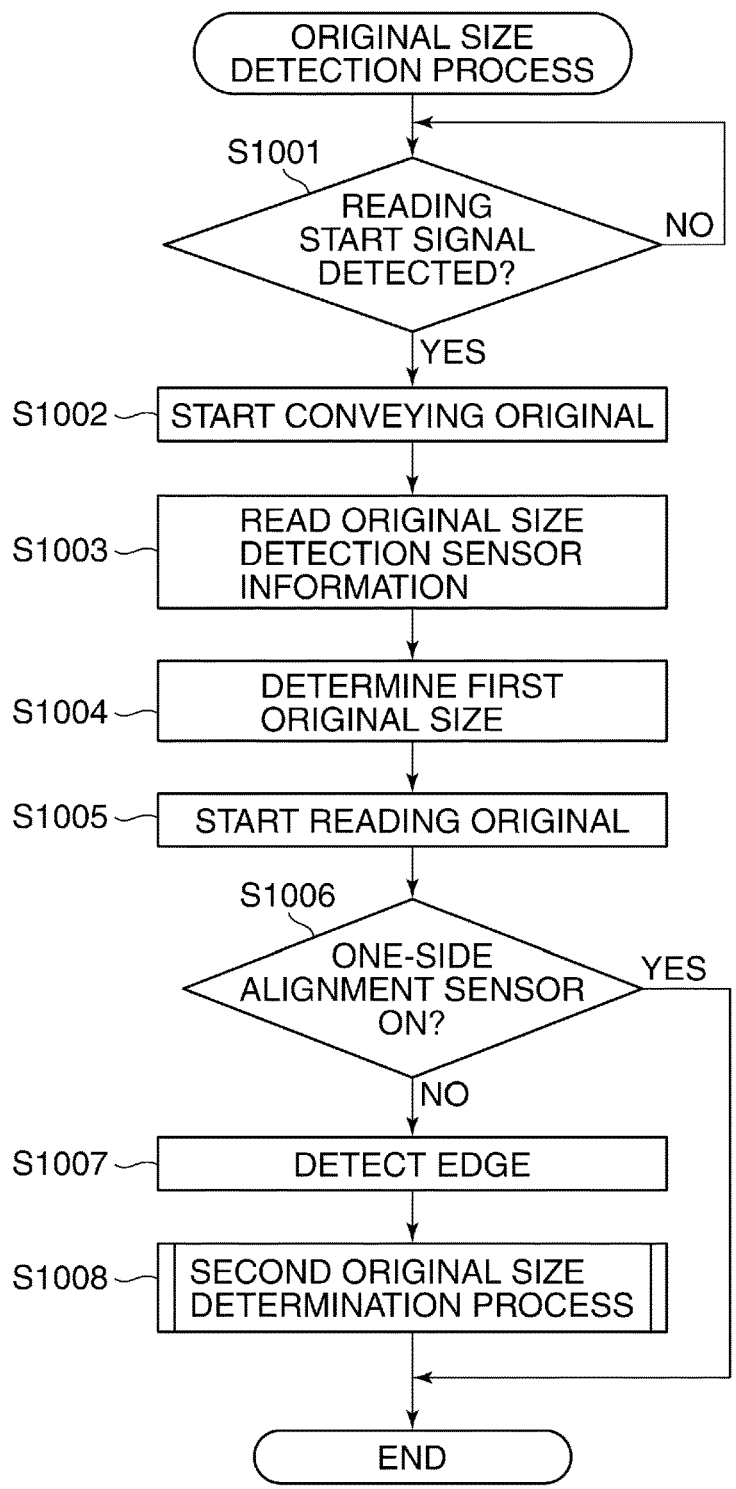
FIG. 9 is a flowchart showing the procedure of an original size detection process which is carried out by the image reading apparatus according to the second embodiment.

FIG. 9 is a flowchart showing the procedure of the original size detection process which is carried out by the image reading apparatus according to the second embodiment. As with the first embodiment, this original size detection process is carried out by the CPU 202 of the signal processing substrate 127 in accordance with an original size detection program stored in the ROM, not shown.

Processes in steps S1001 to S1005 in FIG. 9 are the same as those in the steps S301 to S305 in FIG. 3 according to the first embodiment, and therefore, description thereof is omitted.

After starting to read an image off an original in the step S1005, the CPU 202 judges whether or not the one-side alignment sensor 801 is on (step S1006).

Figure 10A:
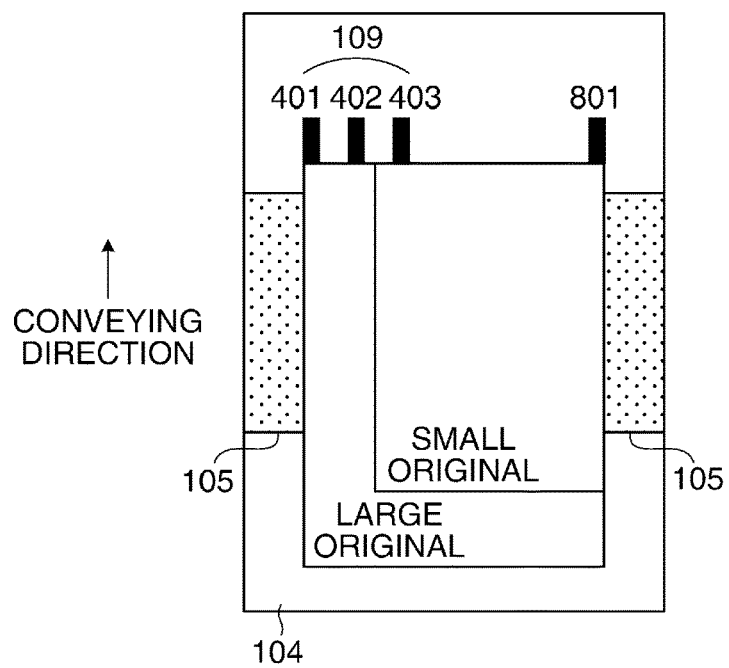
FIGS. 10A and 10B are views useful in explaining a one-side alignment sensor.
Figure 10B:
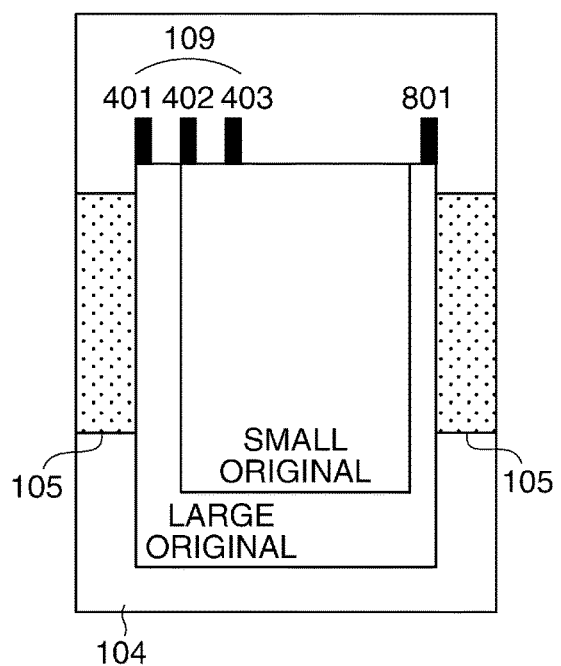

FIGS. 10A and 10B are views useful in explaining the one-side alignment sensor 801.

Referring to FIGS. 10A and 10B, the one-side alignment sensor 801 is an opposed sensor placed so as to be opposed to the original size detection sensor 109 comprised of the three sensors that detect one side of an original. The one-side alignment sensor 801 is disposed on the one restriction plate 105 side opposed to the other width restriction plate 105 side on which the original size detection sensor 109 is placed so that the one-side alignment sensor 801 can detect one side of an original supported by the one width restriction plate 105. The one-side alignment sensor 801 is configured to always lie at such a position as to detect one side of an original opposed to the other side of the original detected by the original size detection sensor 109 and moves in the main scanning direction in response to movement of the one width restriction plate 105. The one-side alignment sensor 801 is turned on when it detects an original as with the sensors 401 to 403 of the original size detection sensor 109.

As shown in FIG. 10A, when originals of different sizes are placed on the original tray 104 with edges aligned on the one-side alignment sensor 801 side, an output from the one-side alignment sensor 801 is on, and an original size detected by the original size detection sensor 109 is correct. On the other hand, as shown in FIG. 10B, when originals of different sizes are placed on the original tray 104 with edges not aligned on the one-side alignment sensor 801 side, an output from the one-side alignment sensor 801 may be off. In this case, an original size detected by the original size detection sensor 109 is incorrect. Namely, in the example shown in FIG. 10B, a small original that is small in size is erroneously detected as a medium original that is medium in size.

In the present embodiment, in order to prevent such erroneous detection, an original size detection result is selected based on whether or not the one-side alignment sensor 801 is on. Specifically, as a result of the judgment in the step S1006 in FIG. 9, when the one-side alignment sensor 801 is on ("YES" in the step S1006), the first original size determined in the step S1004 is adopted as a final original size, and the present process is terminated.

On the other hand, as a result of the judgment in the step S1006, when the one-side alignment sensor 801 is not on but off ("NO" in the step S1006), the process proceeds to steps S1007 and S1008, in which the CPU 202 in turn detects an original size based on a result of edge detection on image data. Specifically, as with the steps S307 and S308 in the first embodiment (FIG. 3), the CPU 202 carries out the second original size determination process to adopt the second original size as a final original size and terminates the present process.

According to the present embodiment, whether to adopt the first original size determined based on a result of detection by the original size detection sensor 109 or the second original size detected from an edge of an image is determined based on an output from the one-side alignment sensor 801. As a result, even when originals are mixed originals of different sizes, the originals are placed with edges aligned on the one-side alignment sensor 801 side, and hence images are successfully read without degrading productivity. On the other hand, even when mixed originals of different sizes are placed with edges not aligned on the one-side alignment sensor 801 side, the first original size determined based on a result of detection by the original size detection sensor 109 is adopted, and this prevents erroneous detection of an original size to successfully read images.

In the present embodiment, it is preferred that irrespective of whether or not the reading mode is the mixed-size mode, the user is prompted to place originals with edges aligned on one side, i.e. the one width restriction plate 105 side on which the one-side alignment sensor 801 is placed. This secures productivity of image reading.

A description will now be given of a third embodiment.

A hardware arrangement of an image reading apparatus according to the third embodiment is the same as that of the image reading apparatus according to the first embodiment, and they differ only in terms of control arrangements.

Figure 11:
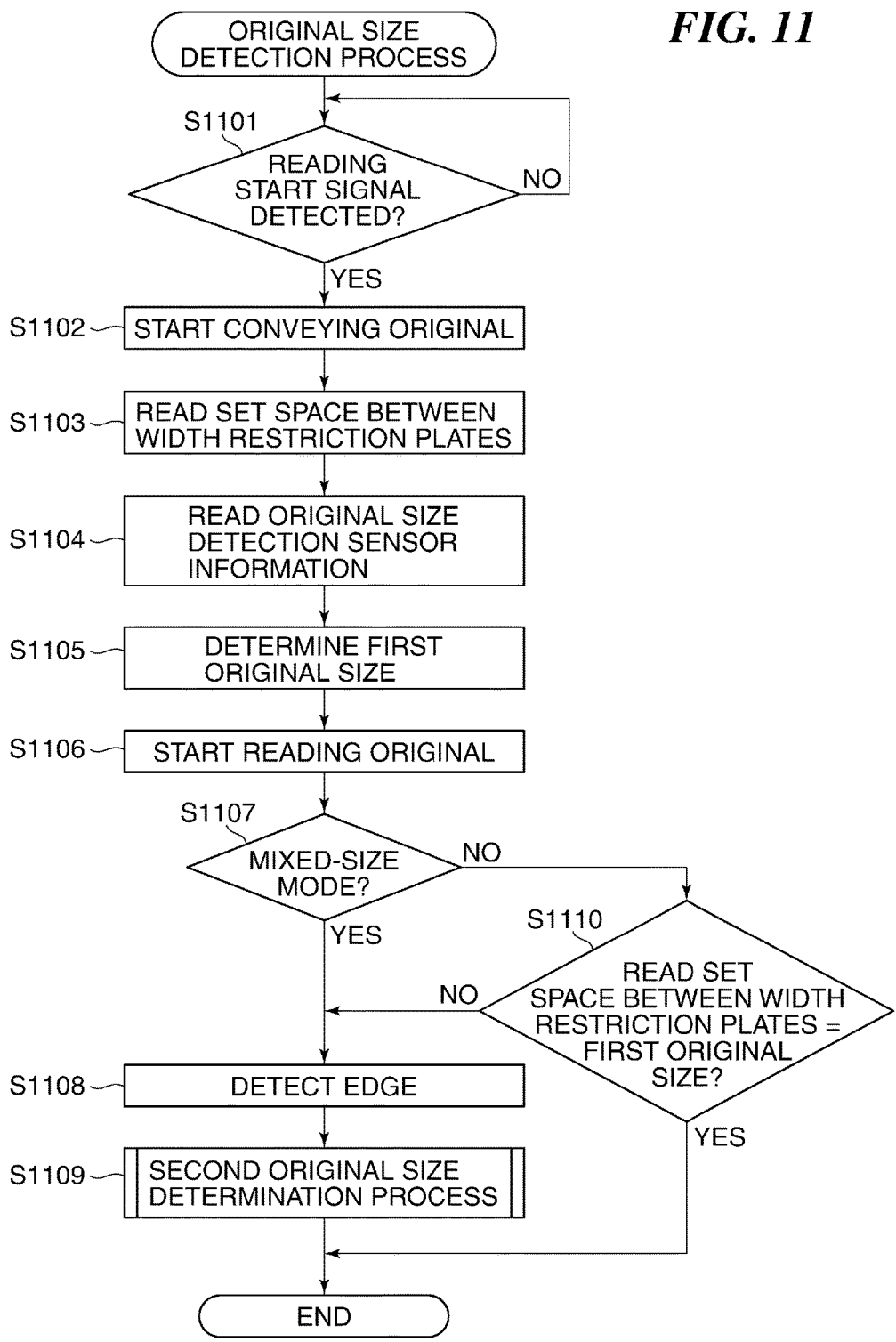
FIG. 11 is a flowchart showing the procedure of an original size detection process which is carried out by an image reading apparatus according to a third embodiment.

FIG. 11 is a flowchart showing the procedure of an original size detection process which is carried out by the image reading apparatus according to the third embodiment. As with the first embodiment, this original size detection process is carried out by the CPU 202 of the signal processing substrate 127 in accordance with an original size detection program stored in the ROM, not shown.

Referring to FIG. 11, in the present embodiment, a process in which a set space between the width restriction plates is read (step S1103) is additionally carried out next after the step S302 of the original size detection process in the first embodiment. Also, a process in which when it is judged in the step S306 in the present embodiment that the reading mode is not the mixed-size mode, a set space between the width restriction plates 105 and a first original size determination result are compared with each other (step S1110) is added.

A description will now be given of the original size detection process which is carried out by the image forming apparatus according to the third embodiment with a focus on a differences from the original size detection process in FIG. 3.

Processes in steps S1101 and S1102 in FIG. 11 are the same as those in the steps S301 and S302 in FIG. 3, and therefore, description thereof is omitted.

After starting to convey an original in the step S1102, the CPU 202 reads a set space between the width restriction plates 105 (step S1103).

Figure 12A:
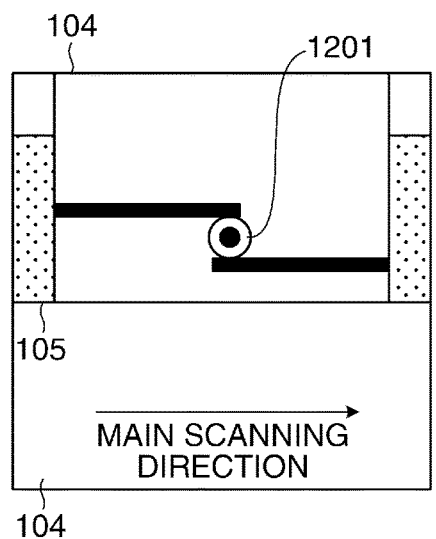
FIGS. 12A and 12B are plan views showing width restriction plates, FIG. 12A showing how an original with a maximum width allowed to be placed on an original tray is restricted, and FIG. 12B showing how an original smaller in size than an original with the maximum width allowed to be placed on the original tray is restricted.
Figure 12B:
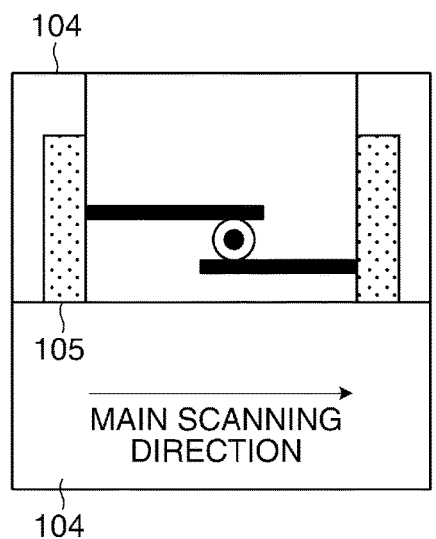

FIGS. 12A and 12B are plan views showing the width restriction plates 105, FIG. 12A showing how an original with a maximum width allowed to be placed on the original tray is restricted, and FIG. 12B showing how an original smaller in size than an original with the maximum width allowed to be placed on the original tray is restricted. Referring to FIG. 12A, when an original with the maximum width is set, the user places the original with the space between the width restriction plates 105 increased.

The width restriction plates 105 have an original width detection volume resistor 1201 provided in a central part of the original tray 104. The original width detection volume resistor 1201, which is a resistance unit, is configured to rotate in response to movement of the width restriction plates 105 such that when the space between the width restriction plates 105 is increased, volume resistance is decreased, and when the space between the width restriction plates 105 is decreased, volume resistance is increased. Thus, by detecting a value of the original width detection volume resistor 1201, a set space between the width restriction plates 105 is read.

After reading a set space between the width restriction plates 105 (step S1103), the CPU 202 reads information from the original size detection sensor 109 (step S1104) and then carries out the same processes as those in the steps S304 to S308 in FIG. 3 (steps S1105 to S1109).

Then, when the CPU 202 judges in the step S1107 that the reading mode is not the mixed-size mode (NO in the step S1107), the process proceeds to step S1110. Specifically, the CPU 202 judges whether or not the set space between the width restriction plates 105 and an original width that is an original size determined in the step S1105 are the same (step S1110).

Figure 13A:
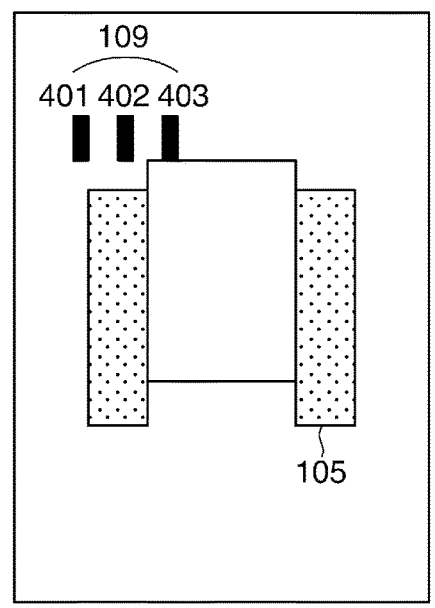
FIGS. 13A and 13B are views showing the positional relationship between the width restriction plates and an original, FIG. 13A showing a state in which the width restriction plates abut on the original, and FIG. 13B showing a state in which the width restriction plates do not abut on the original.
Figure 13B:
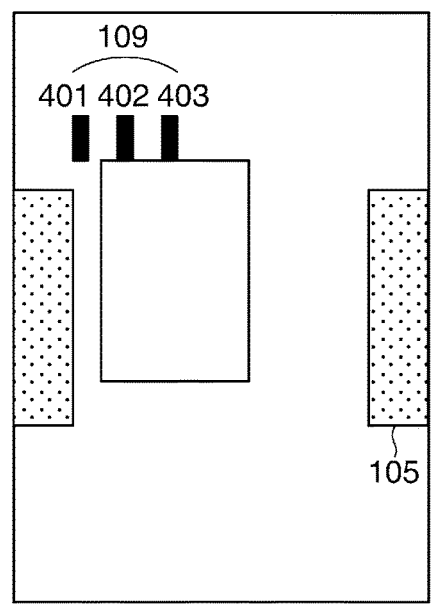
Figure 14A:
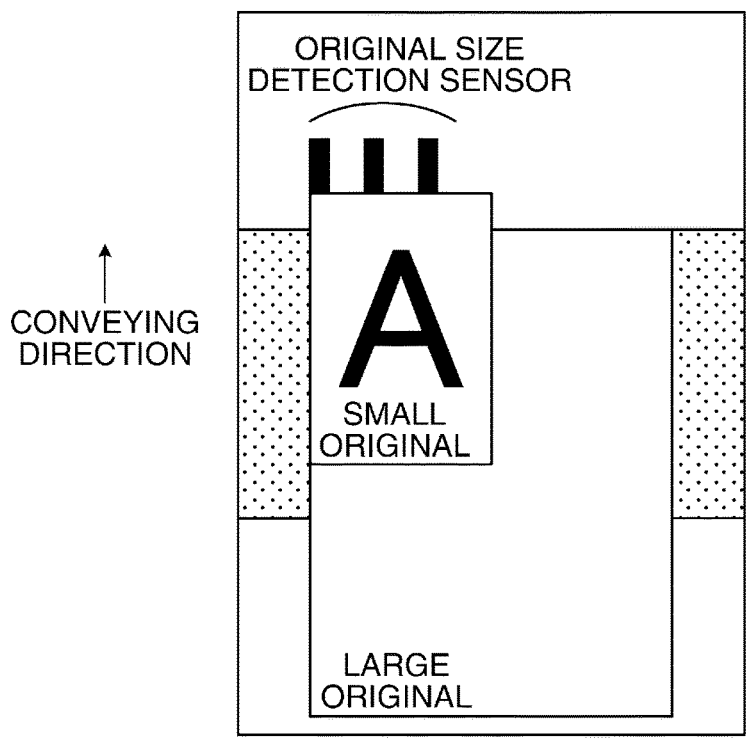
FIGS. 14A to 14D are views useful in explaining problems of a prior art.
Figure 14B:
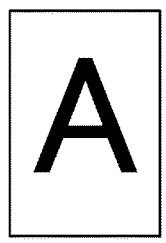
Figure 14C:
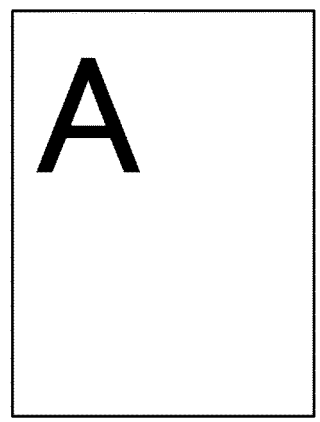
Figure 14D:
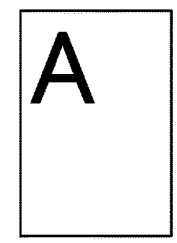

FIGS. 13A and 13B are views showing the positional relationship between the width restriction plates 105 and an original, FIG. 13A showing a state in which the width restriction plates 105 abuts on the original, and FIG. 13B showing a state in which the width restriction plates 105 do not abut on the original. Referring to FIG. 13A, the space between the width restriction plates 105 is set so as to abut on the original. Thus, only the sensor 403 among the three sensors constituting the original size detection sensor 109 is on, and as a result of detection of the width of the original in the main scanning direction, it is correctly judged that the original is a small original that is small in size. On the other hand, as shown in FIG. 13B, when the space between the width restriction plates 105 is set such that they do not properly abut on the original, both the sensor 402 and the sensor 403 among the three sensors constituting the original size detection sensor 109 are on, and it is erroneously judged that the original is a medium original although it is actually a small original.

Thus, in the present embodiment, in the example shown in FIG. 13B, whether or not a read value of a set space between the width restriction plates 105 and the first original size determined based on a result of detection by the original size detection sensor 109 are the same is judged (step S1110).

As a result of the judgment in the step S1110, when the set space between the width restriction plates 105 and the first original size determination result are the same, the CPU 202 adopts the first original size detected in the step S1105 as a final original size. On the other hand, as a result of the judgment in the step S1110, when the set space between the width restriction plates 105 and the first original size determination result are different, the process proceeds to steps S1108 and S1109, in which the CPU 202 in turn carries out a second original size determination process. Specifically, as with the steps S307 and S308 in the first embodiment (FIG. 3), the CPU 202 carries out the second original size determination process which is a subroutine, adopts the second original size as a final original size, and terminates the present process. This prevents erroneous detection by the original size detection sensor 109 occurring in the example shown in FIG. 13B.

According to the process in FIG. 11, when the width restriction plates 105 are correctly set, that is, when the set space between the width restriction plates 105 and the first original size determination result are the same, the first original size detected in the step S1105 is adopted as a final original size. On the other hand, when the set space between the width restriction plates 105 and the first original size determination result are different, the process proceeds to the step S1109, in which an original size is detected from an edge of image data. As a result, when the reading mode is the mixed-size mode, an original size is correctly detected by adopting the second original size, and on the other hand, even when the reading mode is not the mixed-size mode, and the space between the width restriction plates 105 is not properly set, erroneous detection of an original size is prevented.

It should be noted that in the first to third embodiments described above, the image reading apparatus has the normal mode and the mixed-size mode as the reading mode. Other than these two modes, the image reading apparatus of the present invention may have another reading mode such as a reading mode in which an original bundle including a plurality of originals of different sizes in a longitudinal direction of the originals is read. In the reading mode in which an original bundle including a plurality of originals of different sizes in a longitudinal direction of the originals is read, sizes in a width direction of the plurality of originals included in the original bundle are the same, and thus a first original size is used for determining the width of the originals.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-075865, filed Apr. 2, 2015 which is hereby incorporated by reference herein in its entirety.

What is claimed is:

1. An image reading apparatus comprising:
an original tray on which an original is placed;
a conveyor configured to convey the original on said original tray to a reading position along a conveying path;
a pair of restriction members configured to restrict the original in a width direction;
an original detector configured to detect the original being conveyed by the conveyor;
an image line sensor configured to read an image of the original passing through the reading position and output image data;
a processor;
a first determination unit configured to determine a size of the original in the width direction according to a result of detection by said original detector;
a second determination unit configured to detect edges at each of a plurality of positions in a main scanning direction intersecting a conveying direction of the conveying path based on the image data output from the image line sensor, and determine a size of the original in the width direction based on the detected edges;
a third determination unit configured to determine a size of the original in the width direction according to a space between said pair of restriction members; and
a selection unit configured to obtain a reading mode for an original, and, when the reading mode is a first reading mode in which a bundle of originals including originals having the same size in the width direction is read, select the size of the original in the width direction determined by said first determination unit, and, when the reading mode is a second reading mode in which a bundle of originals including a plurality of originals of different sizes in the width direction is read, select the size of the original in the width direction determined by said second determination unit, wherein, when the size of the original in the width direction determined by said first determination unit and the size of the original in the width direction determined by said third determination unit are different, said selection unit is configured to select the size of the original in the width direction determined by said second determination unit, and wherein said processor is configured to operate to function as said first determination unit, said second determination unit, said third determination unit, and said selection unit.

2. The image reading apparatus according to claim 1, wherein said second determination unit is configured to detect a leading edge of the original in the main scanning direction.

3. The image reading apparatus according claim 1, wherein said original detector comprises a plurality of original sensors, wherein each of the plurality of original sensors is configured to detect presence or absence of an original, wherein the plurality of original sensors is arranged at the same position in the conveying direction of the conveying path and at different positions in the main scanning direction, and wherein the same position of the plurality of original sensors in the conveying direction is located upstream of the reading position in the conveying path.

4. The image reading apparatus according to claim 3, wherein said first determination unit is configured to determine the size of the original in the width direction according to a combination of results of detection by the plurality of original sensors.

5. The image reading apparatus according to claim 1, further comprising a resistor configured to rotate in response to movement of the pair of restriction members, wherein the space between said pair of restriction members is determined according to a detected value of said resistor.

6. An image reading apparatus comprising:

an original tray on which an original is placed;

a pair of restriction members configured to restrict an original in a width direction on the original tray;

a conveyor configured to convey the original on said original tray to a reading position along a conveying path;

first original detectors provided in a first side area in the width direction intersecting a conveying direction of the conveying path and configured to detect the original being conveyed by the conveyor;

a second original detector provided in a second side area, other than the first side area, in the width direction and configured to detect the original being conveyed by the conveyor;

an image line sensor configured to read an image of the original passing through the reading position and output image data; and a processor configured to, in a case where said second original detector detects the original being conveyed by the conveyor, select a size of the original in the width direction determined according to a result of detection by said second original detector, and, in a case where said second original detector does not detect the original being conveyed by the conveyor, select the size of the original in the width direction determined according to results of detection by said first original detectors.

* * * * *